Patented Dec. 8, 1953

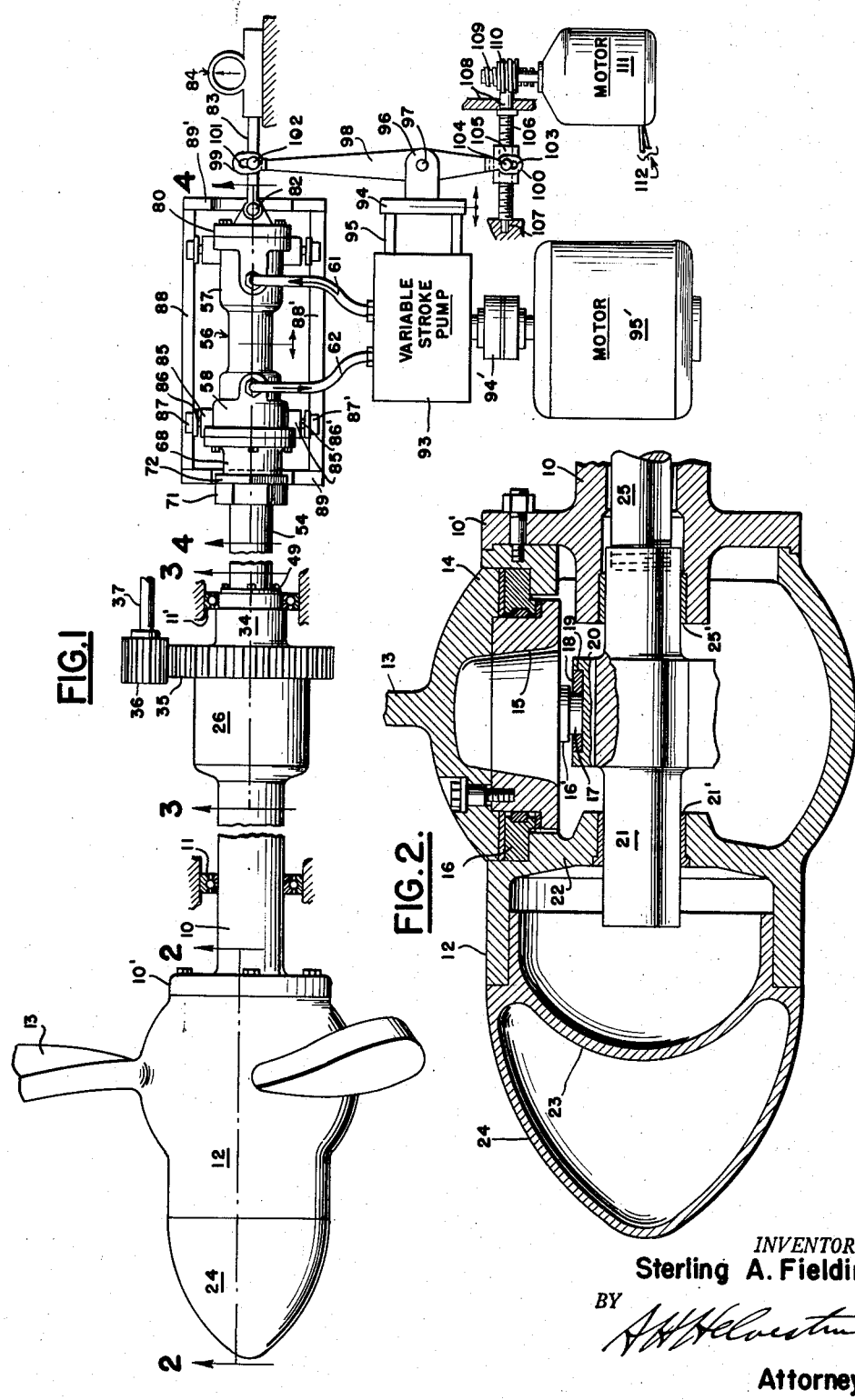

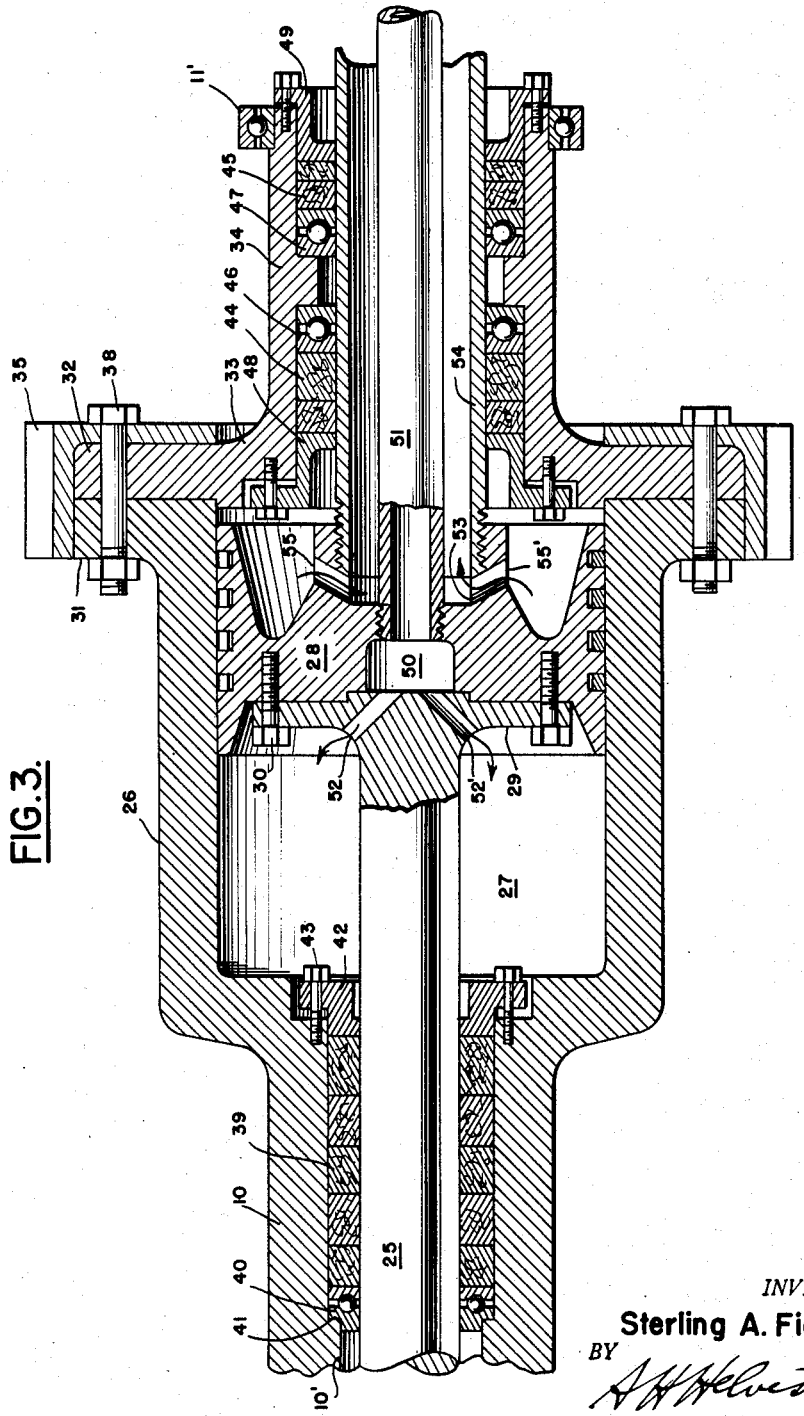

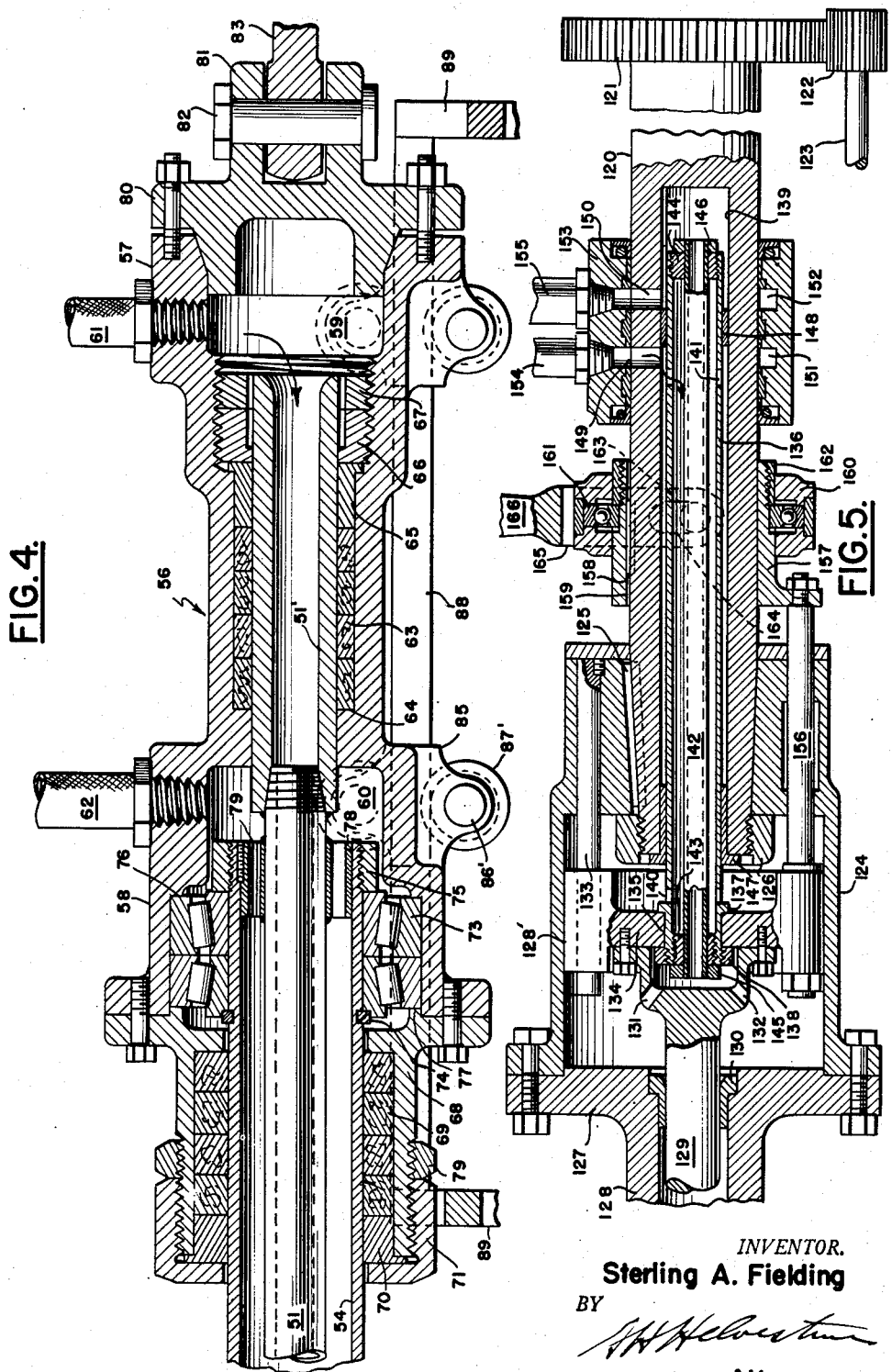

2,661,807

UNITED STATES PATENT OFFICE 2,661,807

HYDRAULIC PITCH CONTROL DEVICE FOR PROPELLERS

Sterling A. Fielding, Portsmouth, Va.

Application April 28, 1949, Serial No. 90,213

5 Claims. (Cl. 170—160.32)

(Granted under Title 35, U. S. Code (1952), sec. 266)

This invention relates to a propeller adjusting mechanism, and more particularly to a hydraulic operating mechanism for changing the pitch angle of a reversible-blade screw propeller.

Heretofore, the servo-mechanism for changing blade pitch was operated by oil supplied from a surge tank kept under air pressure. The operating pressure on the oil was limited by the pressure that could be effectively maintained in the surge tank without excessive leakage through the various valves and packings of the device. This in turn set the maximum working pressure of the fluid which due to its relative low magnitude necessitated the use of large servo-motor cylinders, larger than would be required if higher oil pressures could be used.

If the production of the high fluid pressures required for operating purposes could be limited only to those peak periods when necessary to change the pitch of the blades or vanes, such as during maneuvering periods, excessive leakage could be minimized as the maximum pressures would not have to be constantly maintained.

The present invention, therefore, produces high fluid operating pressures only during those periods within which to effect a desired pitch change.

The present invention is essentially a hydraulic servo-mechanism, mounted within the propulsion shaft or incorporated in or near the hub of the propeller itself, and a variable-stroke hydraulic pump for creating the high fluid pressures for operating the servo-mechanism to vary the pitch of the blades or vanes of the propeller. A follow-up mechanism is included and is actuated by the servo-mechanism to return it to a neutral position as the blades reach or assume the desired pitch angle.

The present invention may be utilized in adjusting the blade pitch of a marine propeller as well as those of turbine wheels, pump wheels and similar devices.

It is therefore an object of the present invention to provide a hydraulic operating mechanism in which the operating pressures can be built up as high as necessary within the limits of the parts involved when desired to effect a pitch change of a propeller.

It is a further object to provide a positive means for adjusting the blade pitch of propeller blades and for holding such parts in adjusted positions thereby preventing accidental movement out of adjusted positions.

It is an additional object of the present invention to provide a remotely-controlled hydraulic operating mechanism for varying the pitch of propeller blades.

Other objects and many of the attendant advantages of this invention will be readily appreciated as the same becomes better understood by reference to the following detailed description when considered in connection with the accompanying drawings in which like reference numerals refer to like parts throughout the figures and wherein:

Figure 1 illustrates the general organization embodying one form of the invention;

Figure 2 is a cross sectional view through line 2—2 of Figure 1;

Figure 3 is a cross sectional view through line 3—3 of Figure 1;

Figure 4 is a cross sectional view through line 4—4 of Figure 1; and

Figure 5 is a view similar to Figure 4 but showing a modification thereof.

As shown in Figure 1, a hollow propulsion shaft 10 is supported by spaced conventional anti-friction bearings suitably mounted on a fixed structure as diagrammatically shown by the parts 11 and 11'. The propulsion shaft 10 terminates in a flange 10' to which is attached a propeller hub body 12. The hub body 12 has a plurality of adjustable propeller blades 13 rotatable on axes perpendicular to the axis of the hub body 12. Each blade 13 has a flange 14 and a crank arm ring 15 secured to it by which the blade can oscillate on an annular ring 16 secured to the propeller hub body 12.

Secured to the crank pin ring 15 is a crank arm 16' having a crank pin 17 journalled in a slide block 18 that is slidable in a slot 19 contained in a projection 20 forming part of an extension rod 21. The axis of the slot 19 extends at an angle to the axis of the rod 21 as a result of which reciprocation of the rod 21, for a reason to appear, will oscillate the crank arm 16 which in turn will rotate the blade 13 on the ring 16 to adjust the pitch of the blade.

The propeller hub 12 is provided with a spider portion 22 supporting one end of the rod 21 and the shaft flange 10' supports the other end. The hub 12 is closed by a head 23 the outer portion of which is formed as a cone 24.

Attached to the extension rod 21 is a piston rod 25 extending rearwardly of the propeller hub and through the axial bore 10'' of the propulsion shaft 10, the rear of which as more clearly shown in Fig. 3 is provided with an enlarged portion 26 having a cylinder bore 27. A piston 28 reciprocates in the cylinder bore 27 and is attached to a flange 29, forming part of the piston rod 25, by bolts 30.

The cylinder 26 is provided with a flange 31 against which is abutted a flange 32 of a cylinder head 33 formed with an axially extending stuffing sleeve 34. Supported by the flanges is a gear 35 meshing with a pinion 36 mounted on a shaft 37 driven by a suitable source of power not shown. Bolts 39 secure the gear 35 and flanges 31, 32 into a rigid driven unit.

The bore 10' of the hollow propulsion shaft 10 adjacent the cylinder 26 is provided with a plurality of packing rings 39 held in position at one end by a thrust bearing 40, seated against a shoulder 41, and at the other end by a packing gland 42 held in place by bolts 43. The packing rings 39 seal off one end of the cylinder 26 while the other end of the cylinder is sealed off by packing glands 44 and 45 fixed in position between stop rings 46 and 47 and glands 48 and 49, the latter being fixed to the stuffing sleeve 34.

The piston 28 has an axial bore 50 into which is threaded an inner tube 51. The rear end of the piston rod 25 is provided with a plurality of passageways 52 and 52' for connecting the forward end of the cylinder 26 with the axial bore 50 and thus placing the inner tube 51 in communication with that end of the cylinder for a purpose to appear.

Concentric with the axial bore 50, the piston is provided with a counterbore 53 into which is threaded an outer tube 54. The counterbored portion of the piston is provided with a plurality of passages 55, 55' directed to the rearward end of the cylinder 26 and is connected with the interior of the outer tube 54 for a purpose also to appear.

The concentric tubes 51 and 54 extend rearwardly of the propulsion shaft 10 (see Figure 1) into an injector head 56. As more clearly shown in Figure 4, the injector head 56 is of substantially cylindrical formation having ends 57 and 58 which are enlarged to provide chambers 59 and 60 for receiving fluid under pressure from flexible piping or hoses 61 and 62 in and for a purpose to become apparent.

The inner tube 51 extends into the injector head 56 and terminates in the fluid chamber 59. To prevent leakage of fluid past the tube 51, the intermediate portion of the head 56 is provided with packing rings 63 forced against a shoulder 64 by a packing gland 65 which in turn is held in place by a packing nut 66 locked by a lock nut 67. Although the tube 51 may be formed as a single element, it is for purposes of fabrication provided with a wear extension 51' rotating in the packing rings 63.

To the forward enlarged end 58 is bolted a stuffing box 68 which contains a number of packing rings 69 and a packing gland 70, all held in place by a packing nut 71 threaded on the stuffing box 68 and locked by a lock nut 72.

Through the packing material 69 and 70 extends the outer tube 54 and terminates within anti-friction bearings 73. The inner races of the bearings 73 are fixed to the end of the outer tube 54 between a snap ring 74 and a lock nut 75, and the outer races of the bearing are locked in the enlarged end 58 between a shoulder 76 and an annular flange 77 extending inwardly from the stuffing box 68.

An annular spider 78 is inserted between the tubes 51 and 54 and is secured to the ends of both in any suitable manner. The spider 78 functions as spacing member to maintain the concentricity of the tubes. It also acts as a torsion key to prevent relative twisting between the tubes which must rotate in unison for a reason to appear. The spider 78 is provided with one or more apertures 79 through which fluid within the fluid chamber 60 enters the outer tube 54 for a purpose to be explained.

The injector head 56 has its rear end 57 closed by a housing cap 80 provided with a bifurcated lug 81 through which extends a pivot pin 82 supporting a link 83 which drives any suitable indicator 84 for determining the angle of adjustment of the propeller blades 13.

The injector head 56 reciprocates during adjustment of the blades 13 for a reason to appear and is therefor guided. It is provided with oppositely extending brackets 85 from which extend upper and lower stub axles 86, 86' having upper and lower guide rollers 87 and 87' which ride upon guide tracks 88, 88' fixed to stationary members 89, 89'.

As shown in Figure 4, the stub axles 86 and 86' of each pair extend above and below the plane of the tracks 88 and its pair of rollers 87 and 87' engage opposite sides of their respective track, such as 88.

The flexible hoses 61 and 62 are supplied with fluid under pressure from a variable stroke pump 93 of a type similar to that illustrated by either Patent No. 2,006,880, issued on July 2, 1935, to E. K. Benedek for High Pressure Radial Piston Hydraulic Pump or Motor, or Patent No. 1,965,937, issued on July 10, 1934, to W. Ferris for Variable Displacement Pump.

The pump rotor, not shown, of the pump 93 is driven through a conventional coupling 94' by any suitable device such as a motor 95'. As is customary with variable stroke pumps of the type such as 93, a cradle or carrier, not shown, encircles a rotatable rotor containing a number of cylinders receiving reciprocable pistons. The eccentricity of the cradle or carrier is adjusted transversely of the rotor axis to varying the fluid pressure through the hoses 61 and 62 as well as the direction of flow through them. The adjustment of the cradle or carrier is accomplished by a slide, such as 94, connected to the cradle or carrier by any suitable means such as a pair of rods 95.

The slide 94 carries a bifurcated bracket 96 in which is fixed a pivot pin 97. Pivoted on the pin 97 for oscillation is a lever 98 having its opposite end portions provided with bifurcated ends 99 and 100. The end 99 is formed with elongated slots 101 through which extend the ends of a pin 102 secured to the link 83. The opposite end 100 is similarly provided with elongated slots 103 receiving the ends of a pin 104 fixed to a sleeve 105 threaded on a screw shaft 106 rotatably mounted on fixed bearings 107 and 108.

A gear 109 is fixed to the screw shaft 106 and meshes with a worm 110 driven by a motor 111. The motor 111 is reversible and is suitably controlled by connection of its leads 112 to suitable switches, not shown, located at a position convenient to an operator. The motor 111 thus drives the screw shaft 106 in either direction.

The structures of Figures 3 and 4 may be simplified and the overall length shortened into the construction of Figure 5 wherein the propulsion shaft 120 has fixed thereon a gear 121 meshing with a pinion 122 fixed to a drive shaft 123 driven from a suitable source of power, not shown.

A hydraulic cylinder 124 is mounted on the opposite end of the propulsion shaft 120 and held thereon against rotation by a key 125 and against axial movement by a nut 126. The hydraulic cylinder 124 is closed by a flange 127 forming part of a hollow stub shaft 128 which terminates in a flange, not shown in Figure 5 but similar to the flange 10' of Figure 2 for attachment to a propeller hub.

Within the hydraulic cylinder 124 is a piston 128' to which is bolted a piston rod 129 equivalent to piston rod 25 of Figure 2 and functioning in the same manner to adjust the propeller blades 13. A bearing 130 inserted in the end of shaft 128 cooperates with a bearing, not shown but similar to the bearing 25' of Figure 2, to support the piston rod 129 for sliding movement. The bearing 130 also provides a fluid-tight joint for the passage of the piston rod 129 out of the hydraulic cylinder 124.

The piston rod 129 adjacent its juncture with the piston is formed with one or more fluid passages 131, 132 having a purpose to appear. To insure greater rigidity to the device and to minimize the wear on the cylinder walls, the weight of the piston 128' is partially borne by guide rods 133 secured internally of the cylinder 124.

The web 134 of the piston 128' is bored at 135 into which is inserted an outer tube 136 and secured into that position by a collar 137 and a nut 138 engaging opposed sides of the web.

The propulsion shaft 120 is formed with an axial bore 139 into which the outer sleeve 136 extends. This sleeve is provided at its ends with a plurality of circumferentially arranged apertures 140 and 141 for the passage of fluid as will appear.

Concentrically arranged within the outer tube 136 is an inner tube 142. This inner tube 142 is supported by end spacers 143 and 144 threaded into the ends of the outer tube 136 and sealing the end spacings between it and the inner tube 142. The inner tube 142 is held against axial movement by nuts 145 and 146 threaded on to the ends of the tube 142 and abutted against the spacers 143 and 144.

The outer sleeve 136 is spaced from the walls of the propulsion shaft bore 139 by a bushing 147 at the open end of the bore and by an annular collar 148 adjacent the rear of the outer sleeve. The bushing 147 and the collar 148 form fluid tight joints between the sleeve and the walls of the bore 139.

The collar 148 is fixed between ports 149 and 150 formed in the propulsion shaft 120. These ports are in communication with annular grooves 151 and 152 contained in the sleeve 153 which is held stationary relative to the propulsion shaft 120. The annular grooves are connected to flexible hoses 154 and 155 which function in the same capacity as the flexible hoses 61 and 62 of Figure 1.

Fixed to the piston 128' and extending rearwardly from it and through the hydraulic chamber 124 is a follow-up rod 156. This rod is secured to a sleeve 157 encompassing the propulsion shaft 120. The sleeve 157 can slide axially on the propulsion shaft 120 but is prevented from rotating relative to it by a key 158 fixed to the shaft and slidable within a keyway 159 formed in the sleeve 157.

Carried by the sleeve 157 is a collar 160 within which is fixed the outer race of an anti-friction bearing 161. The inner race of the bearing is fixed to the sleeve 157 by a threaded element 162. The collar 160 can thus be held stationary relative to the sleeve 157 but can be moved longitudinally of the propulsion shaft 120 with the sleeve 157. The sleeve 157 is provided with diametrically-extending pins 163, of which only one is shown, projecting through elongated slots 164, of which only one is shown, formed in a yoke 165 terminating the end of a lever 166.

The lever 166 functions identically to the lever 98 of Figure 1, with the yoke 165 corresponding to the bifurcated portion 99 of the lever 98.

OPERATION

In Figure 1 the apparatus is shown in neutral position with the propeller blades 13 in inoperative position and the piston 28 centrally positioned within its cylinder 26.

The control motor 111 may be energized from a remote control mechanism to rotate in either direction and for a predetermined number of rotations corresponding to the degree of adjustment desired and suitably indicated by an indicator, not shown, in front of the operator.

After the motor 111 has rotated the screw shaft 106 the predetermined number of turns required to obtain a desired degree of adjustment for the blades 13, the motor is de-energized thereby stopping the rotation of the screw shaft 106. During rotation of the motor 111, the threaded shaft 106 will be turned in a direction, for example, to cause the nut 105 to travel to the left, viewed in Figure 1, to tilt the lever 98 clockwise about the trunnions 102 on the link 83 which at this particular moment is stationary.

The tilting of the lever 98 on the trunnions 102 pushes the slide 94 into the casing of the variable stroke pump 93 which in turn adjusts the eccentricity of the cradle or carrier, not shown, found in pumps of this type, as a result of which fluid under pressure is pumped through hose 61 into fluid chamber 59 (see Figure 4), from whence it flows through the inner tube 51 and out passages 52 (see Figure 3) into cylinder 26 to force the piston 28 toward the cylinder head 33. This movement of the piston 28 is accompanied by movement of the piston rod 25 which, as can be seen in Figure 2, actuates the crank arm 16' to rotate the ring 15 to alter the pitch of the propeller blades 13 to a value between zero or neutral position and maximum positive position.

Fluid to the right of piston 28 in chamber 26 is forced out through the passages 55 (Figure 3) into the outer tube 54 and discharged into the oil chamber 60 (Figure 4) for movement into the flexible tube 62 for return to the variable stroke pump 93.

The movement of the piston 28 to the right (Figure 3) shifts the concentric tubes 51 and 54 in the same direction thereby causing the outer tube 54, through the bearing 76 (Figure 4), to move the injector head 56 to the right. As seen in Figure 1, the movement of the injector head 56 occurs on the rails 88, 88', pushing ahead of it the link 83 and its pins 102.

The shifting of the link 83 to the right causes the lever 98 to be now tilted in a clockwise direction on the trunnions 104 which in turn will withdraw the slide 94 from the casing of the pump 93, resetting its carrier to a neutral position thereby stopping further adjustment of the blades 13. The blades are held in their adjusted positions by the variable stroke pump 93 for the reason that reverse flow of the fluid is prevented by the pump.

To adjust the blades back to neutral position or to a value between it and maximum negative position, the motor 111 is energized in a reverse direction causing lever 98 to tilt counterclockwise on the pins 102, as viewed in Figure 1, reversing the flow of fluid. The fluid will be moved by the variable stroke pump 93 through the hose 62 into the outer tube 54 moving the piston 28 to the left, as viewed in Figure 3, and forcing the fluid at the left of the piston 28 out through passages 52, 52' into the inner tube 51 for return to the pump 93, through the hose 61. The indicator 84 indicates the adjustment of the blades 13 as they are being made as well as the adjustment when completed for any particular event.

The mode of functioning of the equipment employing the mechanism of Figure 5 is substantially the same as that above described.

It is thus seen that there is provided a mechanism having a hydraulic device capable of building up the necessary fluid pressure for adjusting propeller blades and for retaining the blades in their adjusted positions. Included also is a follow-up device for resetting the hydraulic device to a neutral position.

It should be understood, of course, that although the foregoing disclosure relates to preferred embodiments of the invention, numerous modifications or alterations may be made therein without departing from the spirit and the scope of the invention as set forth in the appended claims.

The invention described herein may be manufactured and used by or for the Government of the United States for governmental purposes without the payment of any royalties thereon and therefor.

Having thus described the invention, what is claimed is:

1. In a hydraulic operating mechanism comprising in combination, a control motor, a threaded shaft driven thereby, a nut on said threaded shaft adapted to travel longitudinally thereof upon rotation thereof, a variable stroke fluid pump, a control system including means integral with said pump for varying the quantity and direction of fluid pumped thereby, a lever mounted for pivotable movement adjacent said pump, pivotable connecting means connected at one end to said lever and at the other end to said means integral with said pump an injector head having a plurality of oil-receiving chambers, flexible conduits connecting said variable stroke pump with said oil-receiving chambers, means respectively connecting opposite ends of said lever to said nut and said injector head, a hollow rotating propulsion shaft, a cylinder incorporated in said propulsion shaft, a piston slidable in said cylinder, a propeller having adjustable blades mounted on said propulsion shaft, means actuated by said piston and extending through said propulsion shaft for adjusting said blades, concentric tubes extending into said injector head, anti-friction means connecting one of said tubes with said injector head for reciprocating movement therewith, each of said tubes respectively extending into said oil-receiving chambers and through said propulsion shaft, means securing said tubes to said piston, said piston having passages respectively placing said tubes in communication with opposite ends of said cylinder.

2. In a hydraulic operating mechanism comprising in combination, a variable stroke fluid pump, a control system for varying the quantity and direction of fluid pumped thereby, a movable injector head having a plurality of valveless oil receiving chambers, flexible conduits connecting said variable stroke pump with said oil receiving chambers, a hollow rotating propulsion shaft, a cylinder incorporated in said propulsion shaft, a piston slidable in said cylinder, a propeller hub having adjustable blades mounted on said propulsion shaft, means actuated by said piston and extending through said propulsion shaft for adjusting said blades, fluid supply means interconnecting said piston with said movable injector head for supplying pressure fluid to said piston and whereby movement of said piston causes a corresponding change in the position of said injector head, and a follow-up system comprising means connecting said movable injector head with said control system whereby movement of said injector head in response to a change in position of said piston makes operative said follow-up system for cutting off supply of fluid from said pump.

3. The combination according to claim 2 wherein said control system comprises a control motor adjacent said pump for driving a threaded shaft, a nut on said shaft, a protruding member connected with said variable stroke pump, and said follow-up system comprises a link pivoted on said member and interconnecting said injector head and said nut, whereby movement of said injector head actuates said control system for cutting off the supply of fluid to said oil receiving chambers.

4. The combination according to claim 2 wherein said fluid supply means comprises a pair of concentric tubes respectively connecting said chambers in said injector head with the forward and after sides of said piston, a pair of tracks in alignment with said shaft, and means mounting said movable injector head on said tracks for reciprocating movement in a forward and reverse direction.

5. In combination, a hydraulic operating mechanism for controlling the pitch of propeller blades comprising, a hub having a plurality of variable pitch propeller blades, a hollow propulsion shaft connected to said hub, a cylinder incorporated in said shaft, a piston in said cylinder, a piston rod in said hollow shaft, means connecting said piston rod at one end to said piston and at the other end to said blades for changing the pitch of said blades, a hollow movable injector head adjacent said cylinder, inner and outer concentric tubes affixed in said injector head, means connecting said inner and outer tubes with said piston, a first fluid chamber formed by the walls of said inner tube and the forward side of said piston, a second fluid chamber formed by the walls of said outer tube and the after side of said piston, a variable stroke pump, fluid supply and return lines respectively connecting said pump with said first and second fluid chambers, directional flow means connected to said pump for selectively directing the discharge therefrom through either of said supply or return lines, and follow-up means interconnecting said movable injector head with said directional flow means, whereby fluid supplied by said pump to either of said first or second fluid chambers moves said piston in an ahead or rearward direction thereby controlling the pitch of said blades.

STERLING A. FIELDING.

References Cited in the file of this patent

UNITED STATES PATENTS

| Number | Name | Date |
| --- | --- | --- |
| 2,244,770 | Englesson | June 10, 1941 |
| 2,307,039 | Hammond | Jan. 5, 1943 |
| 2,307,849 | Mullen | Jan. 12, 1943 |
| 2,382,389 | Benedek | Aug. 14, 1945 |

FOREIGN PATENTS

| Number | Country | Date |
| --- | --- | --- |
| 343,653 | Great Britain | Feb. 26, 1931 |
| 449,407 | Great Britain | June 26, 1936 |
| 479,888 | Great Britain | Feb. 14, 1938 |
| 553,929 | Great Britain | June 10, 1943 |